Oct. 17, 1944.  G. R. RICH  2,360,795

VALVE

Filed April 24, 1943

INVENTOR.
George R. Rich,
BY Charles O. Shrovey
his Atty.

Patented Oct. 17, 1944

2,360,795

UNITED STATES PATENT OFFICE 2,360,795

VALVE

George R. Rich, Battle Creek, Mich., assignor to Rich Manufacturing Corporation, Battle Creek, Mich., a corporation of Michigan Application April 24, 1943, Serial No. 484,381

8 Claims. (Cl. 123—188)

This invention relates to valves for internal combustion engines, and it relates more particularly to valves such as are used in aero-engines, and the engines of motor propelled land vehicles and vessels. The invention has particular reference to valves that are used in high speed aircraft and tank engines which develop considerable heat during their operation, and one of the objects of this invention is the provision of a three piece valve of which the body of the stem material has a very high value of heat conductivity and contains a core of copper or other abnormally high value of heat conductivity, whereby the intense heat which is absorbed by the valve head is siphoned therefrom by the copper core and speedily conducted to and dissipated through the valve stem into the usual valve guide or other adjacent parts.

As is well known, at the moment of explosion in an internal combustion engine, the top of the head of each valve is subjected to the intense heat of the exploding gaseous mixture, and this takes place while the valve is seated and some of the heat is conducted away by the metal forming the seat for the valve. After the explosion and expansion of the gaseous mixture has taken place, and the piston has been driven down, the exhaust valve is unseated (by suitable means) and the burned gases are exhausted through the opening between the unseated valve head and its seat and discharged into and from an exhaust passage therebelow. There is a continuous flow of hot burned gases in the exhaust passage and consequently the lower face of the valve head and that part of the valve stem located above its valve guide is consequently under the influence of this intense heat, and in the ordinary valves much of this intense heat is conducted to the top of the valve head, creating what is known as a "hot spot," which sometimes causes premature ignition of the gaseous mixture.

One of the objects of this invention is to eliminate the "hot spot" and consequent pre-ignition of the gaseous mixture.

Another object is to provide a valve for use in high speed motors with a head and neck composed of a steel alloy capable of resisting any degree of heat that the head may be exposed to in the operation of the motor and provided with a stem containing a copper core and butt welded to the neck and composed of a steel alloy best adapted for free-acting in its valve guide and also preventing scoring and excessive wear, and preventing extreme expansion both in its length and diameter.

The common sodium cooled valve requires considerable clearance in the valve guide, as much as .006 of an inch or more, with the result that the stem is tilted by the spring, causing one side of the upper end of the stem to bear against the upper edge of the upper end of the bore of the valve guide at one side edge, and the opposite side of the lower end of the stem to bear against the other side edge of the lower end of the bore. This not only causes excessive wear along two short lengths of the stem, but it allows carbon and other foreign matter to enter the clearance space and clog the same, sometimes causing the stem to stick in the valve guide.

The tilting of the stem causes one side of the seating face of the valve head to seat first, thereby allowing a gap between the opposite side of the seating face of the valve head and the seat through which a part of the charge may escape before the spring effectively seats the whole valve head. This has the effect of decreasing the efficiency of the motor.

With my present valve a clearance of from .002 to .003 of an inch is all that is required, consequently the stem cannot be appreciably tilted but remains in substantially true alignment with the axis of the bore in the valve guide, and as a result the above mentioned serious difficulties are wholly eliminated.

Another object is to provide a valve composed of a combination of steel alloys that are highly resistant to corrosion and exidation.

With the provision of a copper core extending from the head, part way through or entirely through the stem, the heat in the valve head (which under normal operating conditions is about 1400° temperature) is reduced fully ten percent; at the weld between the head and stem the temperature is reduced to about 1000° and at the center of the valve guide the temperature is reduced to about 220°. This result is accomplished because the intense heat is conducted away from the head speedily by the copper core and dissipated into the cooler valve guide or other adjacent cooler parts.

With these ends in view, this invention consists in a valve composed of a head and a stem integrally united therewith, the head being composed of a steel alloy having a high value of heat conductivity and the stem composed of a steel alloy having a considerably higher value of heat conductivity, and containing a core of copper or other metal of abnormally high value of heat conductivity whereby heat may be siphoned from the head by the stem with its copper core and dissipated into the valve guide without the use of a cooling medium, such as sodium. The invention further consists in the several novel features hereinafter more fully set forth and claimed.

The invention is clearly illustrated in the drawing accompanying this specification, in which.

Figure 1:
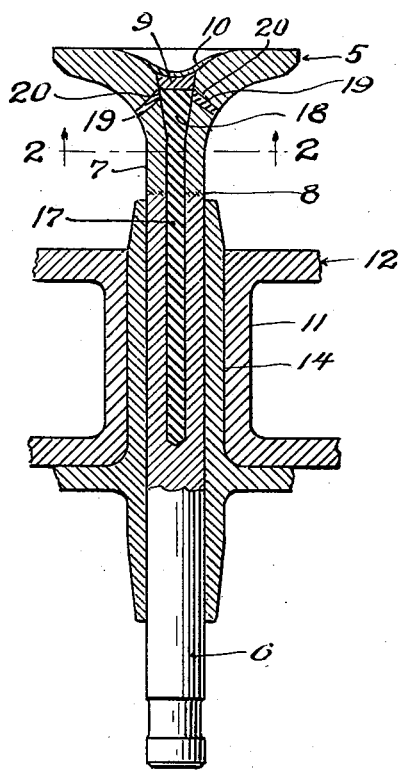
Fig. 1 is a side elevation, partly in ventral longitudinal section of a valve embodying one form of the present invention, installed in a fragment of a cylinder block which is shown in cross section.
Figure 2:
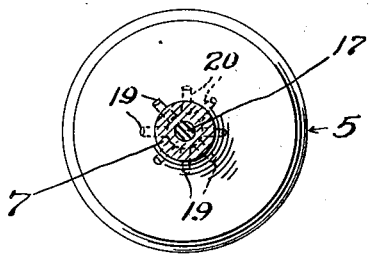
Fig. 2 is a cross section taken on the line 2—2 of Fig. 1.
Figure 3:
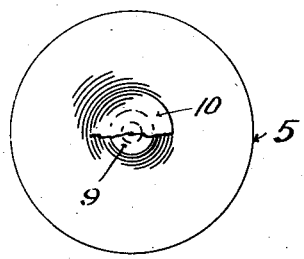
Fig. 3 is a plan of the valve.

Referring to said drawing, and first to Figs. 1 to 3, inclusive, the reference character 5 designates the head of the valve and 6 the stem thereof. The head may be of any desirable shape, and it is here shown as of "tulip" form. Desirably, the head is formed with a short neck 7, to which one end of the valve stem is butt welded or otherwise integrally united therewith as at 8.

The head is formed with the usual tapered seating face, and the stem is provided with the usual groove for a spring retaining element.

As is well understood, the cylinder block 12 of an internal combustion engine is formed with inlet and exhaust ports that are controlled by the valves and that the head of each valve seats upon a tapered seat disposed around the port, and that the valve stem slides in a valve guide 11 usually provided with bushing 14, with the valve head yieldably held upon the seat by a spring.

Figure 4:
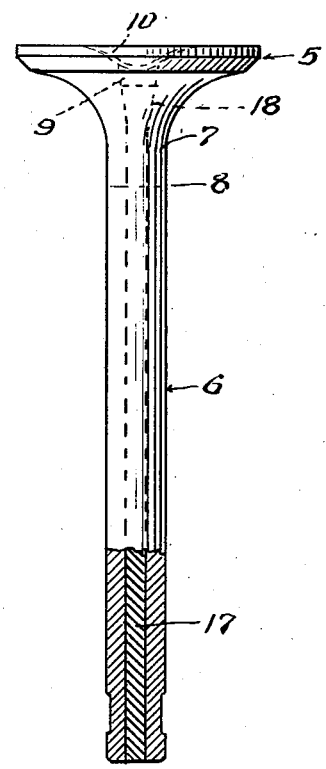
Fig. 4 is a side elevation, partly broken out, of a slightly modified form of the invention.

In the manufacture of my present three piece valve, a short rod, composed of the steel alloy for the head, of the length required to form the head and neck is butt welded to a short rod, composed of the steel alloy for the stem, and of a length required to form the stem. The head end is heated and upset to form an enlargement, and thereafter heated and forged into the shape of the head. The rough piece is machined and ground to size. The head and stem are then bored axially, part way through the stem as shown in the preferred form or entirely through the stem as seen in Fig. 4. Within the head portion the bore is preferably tapered or cone shaped, and a rod 17 of copper or other metal of abnormally high value of heat conductivity, and formed with a flaring or cone shaped head 18 is driven into the bore with a driving fit, a tapered plug 9 is then driven into the tapered bore, and welding metal 10 is then flowed over the end of the tapered plug 9 and upon the adjacent parts of the end face of the valve head and is welded thereto, thereby effectively sealing the copper rod in the valve. The metal weld is machined smooth, and the stem is hardened in any approved manner.

If desired, a number of short copper pins 19 may be driven into bores 20 that radiate from the tapered bore in the valve head to the under face thereof. These copper pins contact with the copper core and conduct heat from the surrounding metal of the valve head to the core, thereby additionally lowering the temperature of the valve head.

In Fig. 4 the copper core extends to the end of the valve stem and conducts heat from the head through the entire length of the stem, much of which heat is dissipated into adjacent cooler places.

The steel alloy of the head of the valve is preferably composed of carbon, silicon, manganese, chromium, nickel, phosphorus, sulphur and iron, and optionally tungsten, and the steel alloy of the stem is preferably composed of the same alloy metals, except that for tungsten, molybdenum may be substituted. Specifically the ingredients of the two pieces of the valve and their proportions are as follows:

| Type | C | Si | Mn | Cr | Ni | Mo | W | P | S |
|------|------|------|------|------|------|------|------|-------|-------|
| Head | 0.20 | 1.10 | 1.10 | 21.0 | 11.0 |      | 2.25 | 0.025 | 0.025 |
| Stem | 0.30 | 3.25 | 1.00 | 7.50 | 2.0  | 0.60 |      | 0.025 | 0.025 | the remainder in each case being iron.

The proportions of the above specified alloying elements may be varied slightly, but in order to obtain the best results the proportions should be kept within a very close range to the ones specified.

The co-efficient of thermal conductivity ($K_t$) is generally expressed as the number of heat units (B. t. u.) given off by the material per hour, per degree F., per square foot, per unit thickness.

Tests made on bars of steel alloys used in the manufacture of my valves, as shown by the following chart, indicate the number of heat units given off per hour:

| Steel | Upper temp. | Lower temp. | Mean temp. | $K_t$ |
|-------|-------------|-------------|------------|-------|
|       | °F. | °F. | °F. | |
| Head  | 642 | 308 | 475 | 73.1 |
|       | 958 | 308 | 633 | 75.7 |
|       | 958 | 642 | 800 | 78.4 |
| Stem  | 582 | 273 | 428 | 144 |
|       | 880 | 273 | 577 | 147 |
|       | 880 | 582 | 731 | 151 |
| Copper is rated at | | | | 990 |

From the above, it is apparent that with the use of the combination of the two steel alloys, above specified, with the copper core, in the manufacture of valves, a cooler valve head is maintained than heretofore and the danger of preignition is eliminated. Furthermore, the valve effectively resists corrosion, oxidation, warping, wear and tear and has a minimum amount of expansion.

Furthermore, the clearance space between the valve stem and its guide is reduced to a minimum, thereby eliminating the possibility of any appreciable amount of tilting of the stem, and excessive wear along short lengths thereof. Furthermore, the heat conducted by the stem is more readily dissipated into the valve guide.

More or less variation of the exact details of construction is possible without departing from the spirit of this invention; I desire, therefore, not to limit myself to the exact form of the construction shown and described, but intend, in the following claims to point out all of the invention disclosed herein.

I claim as new and desire to secure by Letters Patent:

1. A valve comprising a head composed of a steel alloy having a high value of heat conductivity, in combination with a valve stem integrally united with the head and composed of a steel alloy having a substantially higher value of heat conductivity than the head, and a copper core contained in the head and stem, said copper core terminating below the end face of the head, whereby heat is siphoned from the head by the copper core and dissipated therefrom through the stem into a valve guide.

2. A valve comprising a head composed of a steel alloy having a high value of heat conductivity, in combination with a valve stem integrally united with the head and composed of a steel alloy having substantially twice as high value of heat conductivity as the head, and a copper core contained in the head and stem, said copper core terminating below the end face of the head, whereby heat is siphoned from the head by the copper core and dissipated therefrom through the stem into a valve guide.

3. A valve comprising a head composed of a steel alloy having a high value of heat conductivity, in combination with a valve stem integrally united with the head and composed of a steel alloy having a substantially higher value of heat conductivity than the head, and a copper core having a flaring end contained in the head and a stem contained in the valve stem, said copper core terminating below the end face of the head.

4. A valve comprising a head composed of a steel alloy having a high value of heat conductivity, in combination with a valve stem integrally united with the head and composed of a steel alloy having a substantially higher value of heat conductivity than the head, a copper core having a flaring end contained in the head and a stem contained in the valve stem, and copper pins extending radially outward from said flaring end of the copper core.

5. A valve comprising a head composed of a steel alloy having a high value of heat conductivity, in combination with a valve stem integrally united with the head and composed of a steel alloy having a substantially higher value of heat conductivity than the head, and a copper core having a flaring end contained in the head and a stem contained in the entire length of the valve stem, said copper core terminating below the end face of the head.

6. A valve comprising a head composed of a steel alloy having a high value of heat conductivity, in combination with a valve stem integrally united with the head and composed of a steel alloy having a substantially higher value of heat conductivity than the head, a copper core having a flaring end contained in the head and a stem contained in the valve stem, and a metal retaining element over the flaring end of the copper core welded to the adjacent face of the valve head.

7. A valve comprising a head composed of a steel alloy having a high value of heat conductivity, in combination with a valve stem integrally united with the head and composed of a steel alloy having a substantially higher value of heat conductivity than the head, a copper core having a flaring end contained in the head and a stem contained in the valve stem, a plug in the valve head above the flaring end of the copper core and a metal retaining element over the plug welded to the plug and adjacent face of the valve head.

8. A valve comprising a head composed of a steel alloy consisting of the following ingredients in about the following proportions: carbon 0.20%, silicon 1.10%, manganese 1.10%, chromium 21.0%, nickel 11.0%, and the principal part of the remainder, iron, in combination with a valve stem butt welded to the head and composed of a steel alloy consisting of the following ingredients in about the following proportions: carbon 0.30%, silicon 3.25%, manganese 1.00%, chromium 7.50%, nickel 2.0%, and the principal part of the remainder, iron, and a copper core contained in the head and stem.

GEORGE R. RICH.